E. KUHNE.
FEED WATER DE-AERATOR.
APPLICATION FILED NOV. 17, 1909.
990,992.
Patented May 2, 1911.
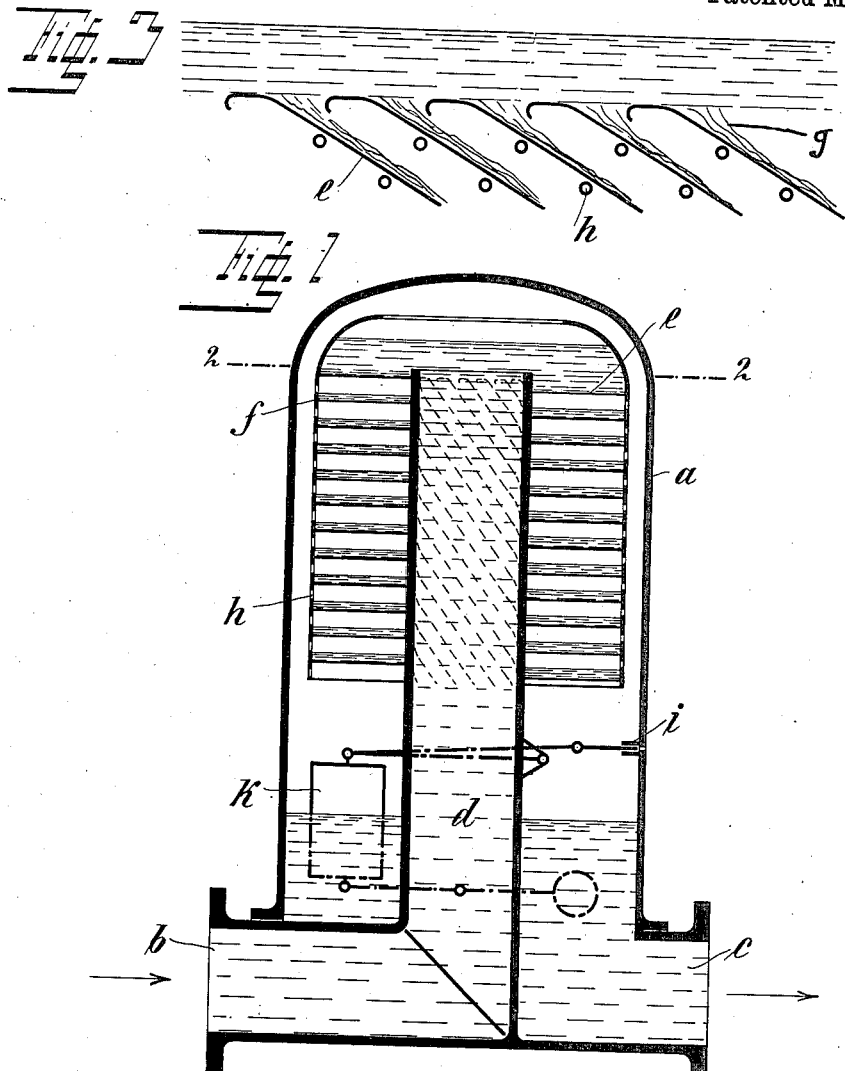
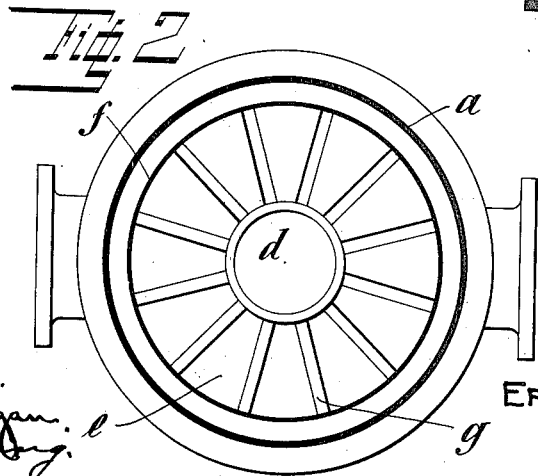
WITNESSES:
INVENTOR.
ERNST KÜHNE,
by
Attorney

UNITED STATES PATENT OFFICE.

ERNST KÜHNE, OF BREMEN, GERMANY.

FEED-WATER DE-AERATOR.

990,992.  Specification of Letters Patent.  Patented May 2, 1911.

Application filed November 17, 1909. Serial No. 528,609.

*To all whom it may concern:*

Be it known that I, ERNST KÜHNE, a subject of the German Emperor, residing at Bremen, Germany, have invented a new and useful Feed-Water De-Aerator; and I do hereby declare the following to be a full, clear, and exact description of the same.

The feeding of steam generators with water is usually effected by means of feed pumps which must take in air in order to run quietly, or must have a greater capacity than corresponds to the quantity of the feed water. This is especially the case with boiler feed pumps which are driven by an engine serving also for another purpose. In the operation of these pumps, a considerable quantity of air is admitted with the feed-water into the steam generator, and this air is in the majority of cases the cause of corrosion and rust-formation in the boiler.

The present invention has for object to remove this air from the feed water.

The accompanying drawing shows by way of example a form of construction of the invention:—

Figure 1 is a vertical section through the feed-water de-aerator. Fig. 2 is a horizontal section upon line 2—2 of Fig. 1, and Fig. 3 is a detail.

A vessel $a$ resembling an air-vessel, is inserted in the feed-piping at $b$, $c$. Inside the vessel $a$ is placed a rising pipe $d$, and around the upper end of this rising pipe $d$ are a number of helical plates $e$, which are enveloped by an outer casing $f$. The entrance to the passages afforded between the helical plates takes place at the top by nozzle-like openings $g$. The shape of these openings is clearly shown in Fig. 3, which represents a development of the inner surface of the shroud or casing $f$ at the upper end of the helical plates $e$. The casing $f$ is provided with a number of orifices $h$, located above each of the helical plates $e$, and its top is extended inwardly for a certain distance so as to overhang the nozzle-openings $g$.

When water enters through the rising pipe $d$, it rises above the upper extremity until a sufficient head exists to cause the flow of an equal quantity down through the nozzles $g$. A portion of the contained air will already separate itself from the water in the upper region. But as the water passing through the nozzles $g$ still contains air, this air is afforded an opportunity of separating from the water, as the latter flows down in a thin layer upon the helical plates $e$. The separated air passes through the orifices $h$ in the wall of the casing $f$. The air gradually accumulates in the top of the vessel $a$ and is exhausted into the atmosphere through a valve $i$. This valve $i$ may be controlled by a float $k$ in such a way that it opens automatically upon the accumulation of an excess of air, that is to say upon the lowering of the water level in the de-aerator.

By reason of the flow of the water over the helical surfaces, the contained air is given a comparatively long time to separate itself from the water; for the same reason the plates themselves require very little space, so that with an apparatus which requires but little room an efficient de-aeration can be obtained.

Having thus described my invention, what I claim as such and desire to secure by Letters Patent is:—

1. A feed-water de-aerator, comprising a vessel, water inlet and outlet to said vessel, a rising pipe upon said water inlet, a plurality of helical plates around said rising pipe, said helical plates affording a plurality of helical passages for the descent of water, said helical plates affording, at their upper ends, entrances to said helical passages, and a casing, said casing enveloping said plates and having openings for the escape of air from said helical passages.

2. A feed-water de-aerator, comprising a vessel, water inlet and outlet to said vessel, a rising pipe upon said water inlet, a plurality of helical plates around said rising pipe, said helical plates affording a plurality of helical passages for the descent of water, said helical plates affording at their upper ends entrances to said helical passages, and a casing, said casing enveloping said plates and having openings for the escape of air from said helical passages, said helical passages being narrower at their upper ends than in their lower parts so as to allow only a thin layer of water to flow down said helical plates.

3. A feed-water de-aerator, comprising a vessel, water inlet and outlet to said vessel, a rising pipe upon said water inlet, a plurality of helical plates around said rising pipe, said helical plates affording a plurality of helical passages for the descent of water, said helical plates affording at their upper ends nozzle-like entrances to said helical passages, a casing, said casing enveloping said plates and having openings for the escape of air from said helical passages, and a float-controlled valve.

In testimony whereof, I have signed my name to this specification in the presence of two subscribing witnesses.

ERNST KÜHNE.

Witnesses:
FRIEDRICH SCHMIDT,
FREDERICK HAGERMANN.